Feb. 5, 1935. W. A. KREGELOH 1,989,810
HOSE SUPPORT
Original Filed June 6, 1932
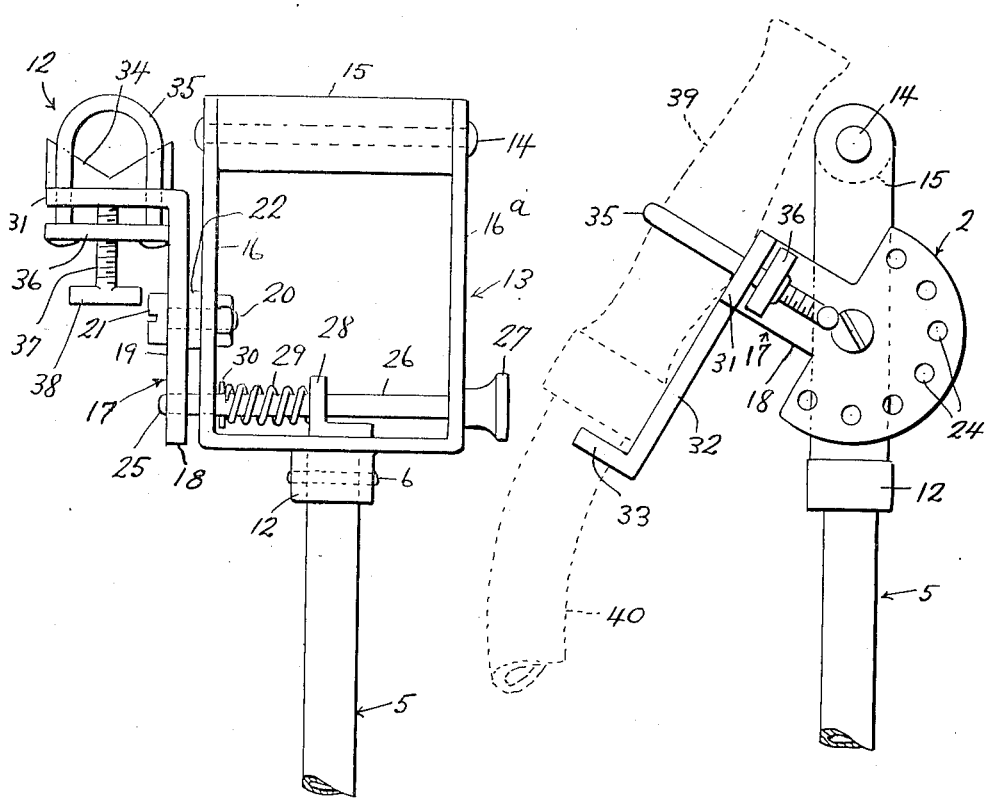
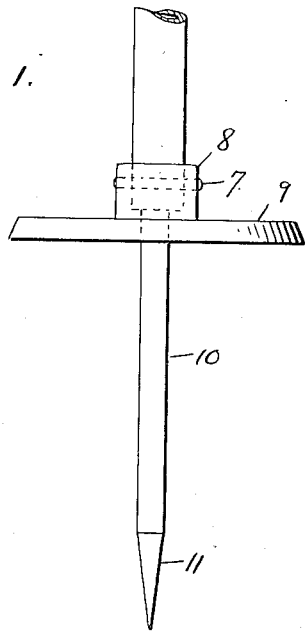
Fig. 1.
Fig. 2.
Inventor
William A. Kregeloh
By Clarence A. O'Brien
Attorney Patented Feb. 5, 1935

1,989,810

UNITED STATES PATENT OFFICE 1,989,810

HOSE SUPPORT

William Alexander Kregeloh, Floral Park, N. Y.

Application June 6, 1932, Serial No. 615,707
Renewed July 2, 1934

5 Claims. (Cl. 248—29)

My invention relates to hose supports, and particularly to an improved hose support of adjustable character for holding a garden hose or the like at different angles.

It is an important object of my invention to provide an adjustable hose support of this character which dispenses with the necessity to maintain and support a hose by hand, which is a tedious and imperfectly performed task and objectionable to most persons, and to supplant other types of hose supports of expensive and inconvenient and inefficient type, which are not readily portable.

Other objects and advantages of my invention will be apparent from a reading of the following description in connection with the drawing, wherein for purposes of illustration I have shown a preferred embodiment of the invention.

In the drawing:—

Figure 1 is a general side elevational view of the embodiment.

Figure 2 is a side elevational view taken approximately at an angle of 90 degrees from the position illustrated in Figure 1, showing in dotted lines a suggested use of a hose in connection therewith.

Referring in detail to the drawing, wherein like numerals refer to like parts throughout the same, it will be observed that the numeral 5 designates a suitable vertical standard which may be a section of pipe provided at each end with a transverse pin 6, 7, for a purpose to be described.

Attached by means of the pin 7 to the lower end of the support 5 is a sleeve 8 on which is formed a relatively wide circular flange 9 for engaging the surface of the ground.

Extending below the flange 9 is a ground piercing rod 10 provided with a tapered point 11 at its lower end. This ground piercing rod 10 is secured in a suitable manner, as by threading the same into the flange 9 or through an aperture in the flange 9 and in the lower end of the standard 5.

On the upper end of the standard 5 and secured by means of the transverse pin 6 is another collar 12 which has formed thereon the U-shaped body generally designated 13 which constitutes the hose support frame and the handle for applying and carrying the embodiment of the invention. Traversing the upper ends of the legs of the U-shaped body 13 is a pin 14 on which is disposed a suitable handle member 15 which bridges the space between the legs of the U-shaped member. Mounted on the leg 16 of the U-shaped body 13 is the hose clamp and support generally designated 17. This comprises an L-shaped member 18 which in the ordinary disposition is in the inverted condition. This is attached by its standard portion 19 swingably with respect to the leg 16 of the frame 13 by means of a bolt 20 which has a machine screw head 21 and a washer 22 interposed between the L-shaped member 18 and the leg 16. This arrangement permits free swinging of the inverted L-shaped member 18. The inverted L-shaped member 18 as shown in Figure 2 has the lower portion thereof expanded into a semi-circular form generally designated 23 in Figure 2 which is provided close to the curved edge thereof with the circumferentially spaced openings 24 adapted to receive the end portion 25 of a transversely slidable spring pressed bolt 26 which is slidably mounted across and in the legs 16, 16a of the U-shaped member 13.

The slidable member 26 has on its outward end a finger grip 27 and when it is in the normal position its opposite end projects as seen in Figure 1 to engage one of the holes 24 in the member 18 which may have been registered therewith by swinging the member 18 into one of the various angular positions permitted by the arrangement of the openings 24. It will be observed that the slidable member 26 is centrally supported by means of an L-shaped bracket 28 with which is engaged one end of the expanding spring 29 circumposed on the member 26 between the bracket 28 and the side 16 of the member 13. The other end of the spring 29 abuts a pin 30 traversing the slidable member 26. This arrangement retains the slidable member 26 normally in the position shown in Figure 1. Withdrawal thereof from engagement with the L-shaped member 18 by pulling upon the finger grip 27 is done against the resistance of the spring 29.

As seen in Figure 2 the foot portion 31 of the L-shaped member 18 has a lateral extension 32 which has at its outer end a vertical projection 33 which has formed therein a V-shaped notch 34. The portion 31 of the member 18 has passed therethrough the legs of an inverted U-bolt 35. The terminals of the legs of the inverted U-bolt 35 are connected beyond the lower side of the portion 31 to a plate 36 which carries threaded therein an adjusting screw 37 provided with the finger grip 38. As seen in the drawing, the screw 37 engages the underside of the portion 31 and acts to draw the bight portion of the U- shaped bolt 35 closer to the upper surface of the portion 31.

In Figure 2 is shown in dotted lines the nozzle portion 39 of a hose placed through the inverted U-shaped bolt 35, and clamped therein by means of turning the screw 37. This clamps the nozzle 30 very securely. In this disposition, it will be observed that the hose 40, of the nozzle 39 is supported by the V-shaped notch 34 in such a manner that it will be properly related to the nozzle in the various positions of angularity permitted by the adjustability of the device of the invention.

It will be obvious that it is a simple matter to transport the embodiment of the invention from place to place without disturbing the relation of a hose clamped thereto and to insert the ground piercing rod 10 into the ground up to the flange 9 which then rests upon the ground and securely supports the embodiment relative to the ground, without appreciably affecting the ground and mutilating the same. The device may be withdrawn from such a position simply by grasping the handle 15 and exerting a withdrawing force thereupon. While in position in the ground, the embodiment properly supports the hose in a desired angularity for different spraying and hosing operations, such as are required in watering a garden, or for other purposes.

Though I have shown and described herein a preferred embodiment of the invention, it is to be definitely understood that I do not desire to limit the application of the invention thereto, and any change or changes may be made in material and structure and arrangement of parts, within the spirit of the invention and the scope of the subjoined claims.

What is claimed is:—

1. A support for a hose including a nozzle, said support comprising a standard, an upright U-shaped member having its bight connected to the upper end of the standard, a hand grip member fastened and between the legs of the U-shaped member, a nozzle clamp bracket swingably mounted laterally on one leg of the U-shaped member, nozzle clamp means carried by the bracket, and releasable bracket holding means carried by the U-shaped member, and a portion on the bracket for supporting the hose adjacent the nozzle.

2. A support for a hose having a nozzle, said support comprising a standard, a ground piercing member carried by the lower end of the standard, a handle member having a cross member by which it is connected to the upper end of the standard, an augularly adjustable bracket mounted on the handle member, nozzle clamping means carried by the bracket, an extension on the bracket for supporting a portion of the hose adjacent the nozzle, and releasable locking means carried by the handle member for locking the adjustable bracket in adjusted positions.

3. A support for a hose having a nozzle, said support comprising a standard, a ground piercing element carried by the lower end of the standard, carrying handle means mounted on the upper end of the standard, an angularly adjustable bracket pivoted on the carrying means to extend laterally therefrom, nozzle clamping means mounted on the bracket means, bracket means locking means carried by and movable relative to the carrying means, and spring means normally urging the locking means into engagement with the bracket means.

4. A support for a hose having a nozzle, said support comprising a standard, a ground piercing element carried by the lower end of the standard, carrying means mounted on the upper end of the standard, an angularly adjustable bracket carried by the carrying means, nozzle clamping means mounted on the bracket means, said nozzle clamping means comprising a U-shaped member having its legs slidable through a portion of the bracket means for clamping the nozzle between itself and the said portion of the bracket means, and tightening means carried by the legs of the U-shaped member and engageable with the said portion of the bracket means for adjustably drawing the U-shaped member toward the said portion.

5. A support for a hose having a nozzle, said support comprising a standard, a ground piercing element carried by the lower end of the standard, carrying means mounted on the upper end of the standard, an angularly adjustable bracket extending laterally from the carrying means, nozzle clamping means mounted on the bracket means, said angularly adjustable bracket comprising a plate pivotally connected to the carrying means and provided with a curved series of holes, and releasable lock means for the bracket traversing the carrying means and slidably engageable in different ones of said series of holes for holding the bracket in adjusted position.

WILLIAM ALEXANDER KREGELOH.